United States Patent
Morimura

Patent Number: 5,940,128
Date of Patent: Aug. 17, 1999

[54] OBJECT IMAGING APPARATUS WITH OBJECT SLANT CORRECTION FACILITY

[75] Inventor: Kazuhiko Morimura, Kanagawa-ken, Japan

[73] Assignee: Canon Kabushiki Kaisha, Tokyo, Japan

[21] Appl. No.: 08/377,498

[22] Filed: Jan. 24, 1995

Related U.S. Application Data

[63] Continuation of application No. 08/067,680, May 26, 1993, abandoned.

[30] Foreign Application Priority Data

Jun. 10, 1992 [JP] Japan ................................. 4-175075
Apr. 15, 1993 [JP] Japan ................................. 5-088660

[51] Int. Cl.⁶ .......................... H04N 5/225; H04N 7/18
[52] U.S. Cl. .................... 348/358; 348/135; 348/222; 348/374; 358/462; 382/298
[58] Field of Search ........................ 382/170, 171, 382/174, 298, 176, 301; 348/207, 222, 358, 373–376, 63, 240, 369, 345, 347, 349, 353–356, 135; 358/462; H04N 7/18, 5/225

[56] References Cited

U.S. PATENT DOCUMENTS

| | | | |
|---|---|---|---|
| 4,115,813 | 9/1978 | Mikami | 348/63 |
| 4,218,702 | 8/1980 | Brocard et al. | 348/211 |
| 4,251,799 | 2/1981 | Jih | 340/146.3 H |
| 4,411,015 | 10/1983 | Scherl et al. | 382/51 |
| 4,734,781 | 3/1988 | Takahashi | 358/280 |
| 4,903,135 | 2/1990 | Ohtake et al. | 358/227 |
| 4,912,559 | 3/1990 | Ariyoshi et al. | 382/46 |
| 4,920,419 | 4/1990 | Easterly | 358/214 |
| 4,963,986 | 10/1990 | Fukuyama et al. | 348/347 |
| 4,969,051 | 11/1990 | Sasaki | 358/447 |
| 4,975,970 | 12/1990 | Zettel et al. | 382/6 |
| 5,020,890 | 6/1991 | Oshima et al. | 348/208 |
| 5,093,653 | 3/1992 | Ikehira | 382/44 |
| 5,097,519 | 3/1992 | Sugiura | 382/47 |
| 5,123,062 | 6/1992 | Sangu | 382/57 |
| 5,155,520 | 10/1992 | Nagasaki et al. | 348/208 |
| 5,214,294 | 5/1993 | Toyofuku | 250/561 |
| 5,227,889 | 7/1993 | Yoneyama et al. | 348/208 |
| 5,253,286 | 10/1993 | Sano et al. | 379/53 |
| 5,280,544 | 1/1994 | Tanaka et al. | 382/18 |
| 5,309,228 | 5/1994 | Nakamura | 358/500 |
| 5,309,253 | 5/1994 | Ariga et al. | 358/451 |
| 5,355,163 | 10/1994 | Tomitaka | 348/234 |
| 5,363,211 | 11/1994 | Hasebe et al. | 358/451 |
| 5,719,969 | 2/1998 | Taguchi | 382/311 |
| 5,805,272 | 9/1998 | Nozawa et al. | 355/25 |

Primary Examiner—Wendy Garber
Assistant Examiner—Ngoc-Yen Vu
Attorney, Agent, or Firm—Robin, Blecker & Daley

[57] ABSTRACT

An image input device according to the present invention is a device for inputting an original into an external device as an image signal. The image input device is arranged to pick up an image of the original and output an image signal corresponding to the original, detect the state of the original relative to an image plane formed by picking up the image, by using the output image signal, and control an image pickup operation in accordance with the detected state of the original relative to the image plane. Accordingly, it is possible to input the image signal corresponding to the original into the external device as the form of an optimum image.

7 Claims, 15 Drawing Sheets

OBJECT IMAGING APPARATUS WITH OBJECT SLANT CORRECTION FACILITY

This is a continuation application under 37 CFR 1.62 of prior application Ser. No. 08/067,680, filed May 26, 1993, now abandoned.

BACKGROUND OF THE INVENTION

1. Field of the Invention

The present invention relates to an image input device for converting an image into an image signal and inputting the image signal into another device.

2. Description of the Related Art

FIG. 1 is a schematic view of the external appearance of a conventional image input device which is used in a video conference system or the like. As shown in FIG. 1, the image input device includes a base 1 on which to place an original 4 such as a map, a graph or a document, a post 2 disposed on the base 1, and a video camera 3 provided at an extending end of the post 2 and used to pick up an image of the original 4, so that a video image of the original 4 consisting of a text, a figure and others is sent out from the image input device.

When the original 4 is placed on the base 1, an image of the original 4 is picked up by the video camera 3 and is sent out from the image input device as a video output. The video output is converted into a standard format which is used in the video conference system, and the image of the original 4 is transmitted to a remote station which participates in a video conference.

In the conventional image input device, if the original 4 is obliquely placed on the base 1, the image of the original 4 is transmitted in the form of an obliquely picked-up image. As a result, conference participants in the remote station will be compelled to see the oblique image, and the video conference is hindered from smoothly proceeding.

FIG. 2 is a block diagram showing the arrangement of the video conference system.

The video conference system shown in FIG. 2 includes, as means for inputting an image, a video camera 301 for photographing a conference participant, an image input device (a so-called electronic OHP) 305 having a video camera 304 for picking up an image of an object or original 303 placed on a base 302, and a graphic input device (for example, a digitizer) 307 for inputting graphic data by means of an input pen 306 or the like. The video conference system also includes a television monitor 308 as means for outputting an image.

In the video conference system shown in FIG. 2, an image control device 309 controls the selective combination of images inputted by the video camera 301 and the image input device 305 and an image received via a communication control device 312 over an ISDN line which will be described later, as well as the outputting of an image to the television monitor 308.

The video conference system shown in FIG. 2 also includes a microphone 309 and a speaker 310, and the inputting of sound by the microphone 309 and the outputting of sound by the speaker 310 are controlled by a sound control circuit 311.

In the video conference system shown in FIG. 2, the communication control device 312 controls connection with a communication line, for example, the ISDN line, whereas a system control device 313 controls the entire system according to an operation of an operating device 314 and according to a graphic input by the graphic input device 307.

A plurality of terminals each of which is arranged in the above-described manner are interconnected via communication lines, so that a video conference can be conducted by communicating images and sounds therebetween.

In the above-described television conference system, operability and functionality are important.

However, in the case of the conventional image input device 305 used in the television conference system of FIG. 2 or the like, if an object is simply placed on the base 302, the object will be excessively large or small in size with respect to the photographic field of the video camera 304. If the zoom mechanism of the video camera 304 is not manually operated, an optimum video image will not be obtained.

Another problem is that if an original like a document is placed on the base 302 and is photographed, characters or lines on the original cannot be displayed with sufficient resolution without making the video camera 304 to zoom in to a sufficient extent.

SUMMARY OF THE INVENTION

It is, therefore, an object of the present invention to provide an image input device capable of solving the above-described problems.

Another object of the present invention is to provide an image input device capable of inputting an image signal corresponding to an original into an external device as an image corrected in an optimum state irrespective of how the original is placed on a base.

To achieve the above-described objects, according to one aspect of the present invention, there is provided an image input device for inputting an original into another device as an image signal, which comprises image pickup means for picking up an image of the original and outputting an image signal corresponding to the original, detection means for detecting a state of the original relative to an image plane formed by picking up the image by the image pickup means, by using the image signal outputted from the image pickup means, and control means for controlling an image pickup operation of the image pickup means in accordance with the state of the original relative to the image plane detected by the detection means.

Another object of the present invention is to provide an image input device capable of inputting an image signal corresponding to an original into an external device as an image corrected in an optimum state irrespective of the size of a figure or a character drawn on the original.

To achieve the above-described object, according to another aspect of the present invention, there is provided an image input device for inputting an original into another device as an image signal, which comprises image pickup means for picking up an image of the original and outputting an image signal corresponding to the original, detection means for detecting a state of distribution of frequency components in the image signal outputted from the image pickup means, and control means for controlling an image pickup operation of the image pickup means in accordance with the state of distribution of the frequency components detected by said detection means.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

Figure 1:
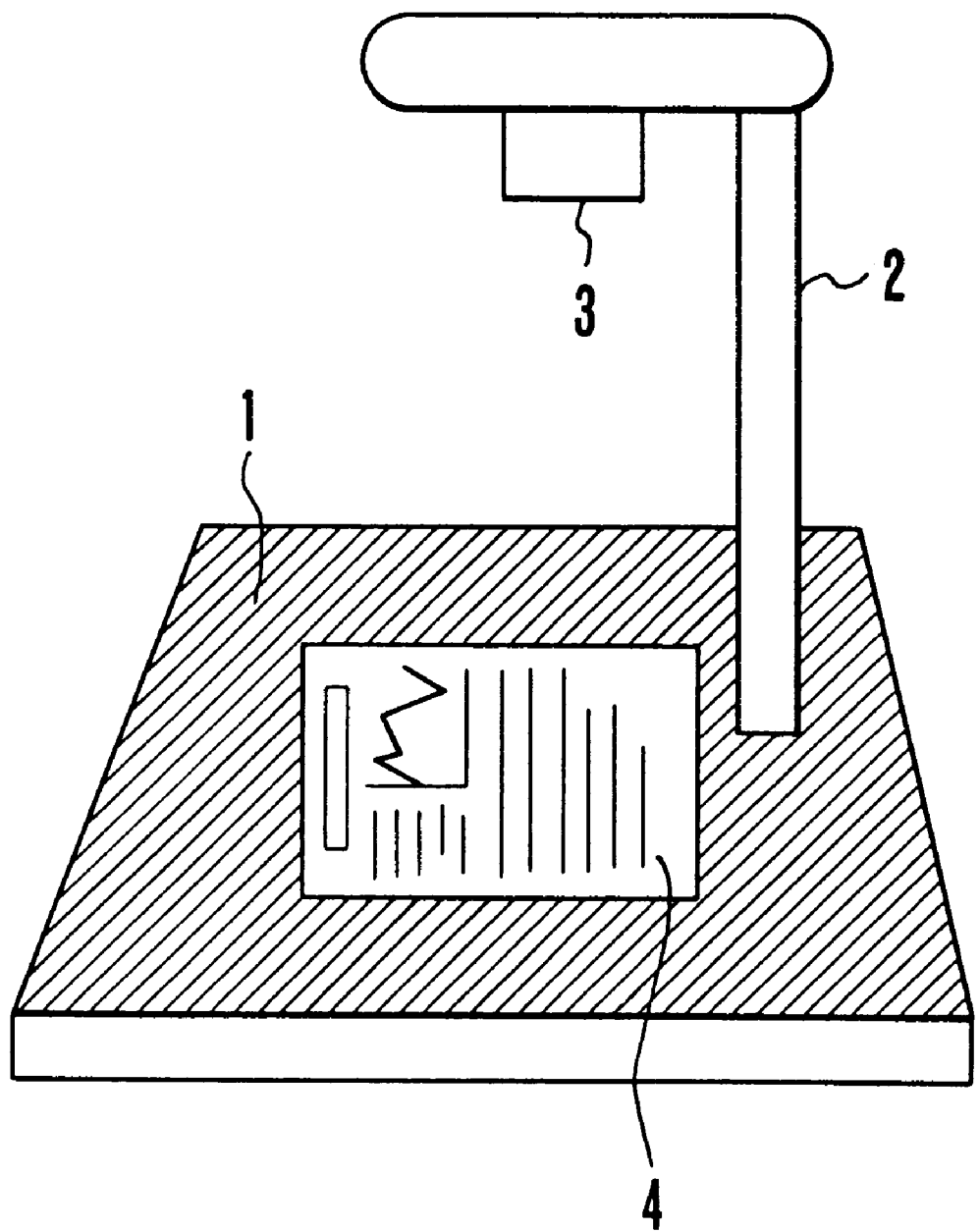
FIG. 1 is a schematic view showing the arrangement of a conventional image input device.
Figure 2:
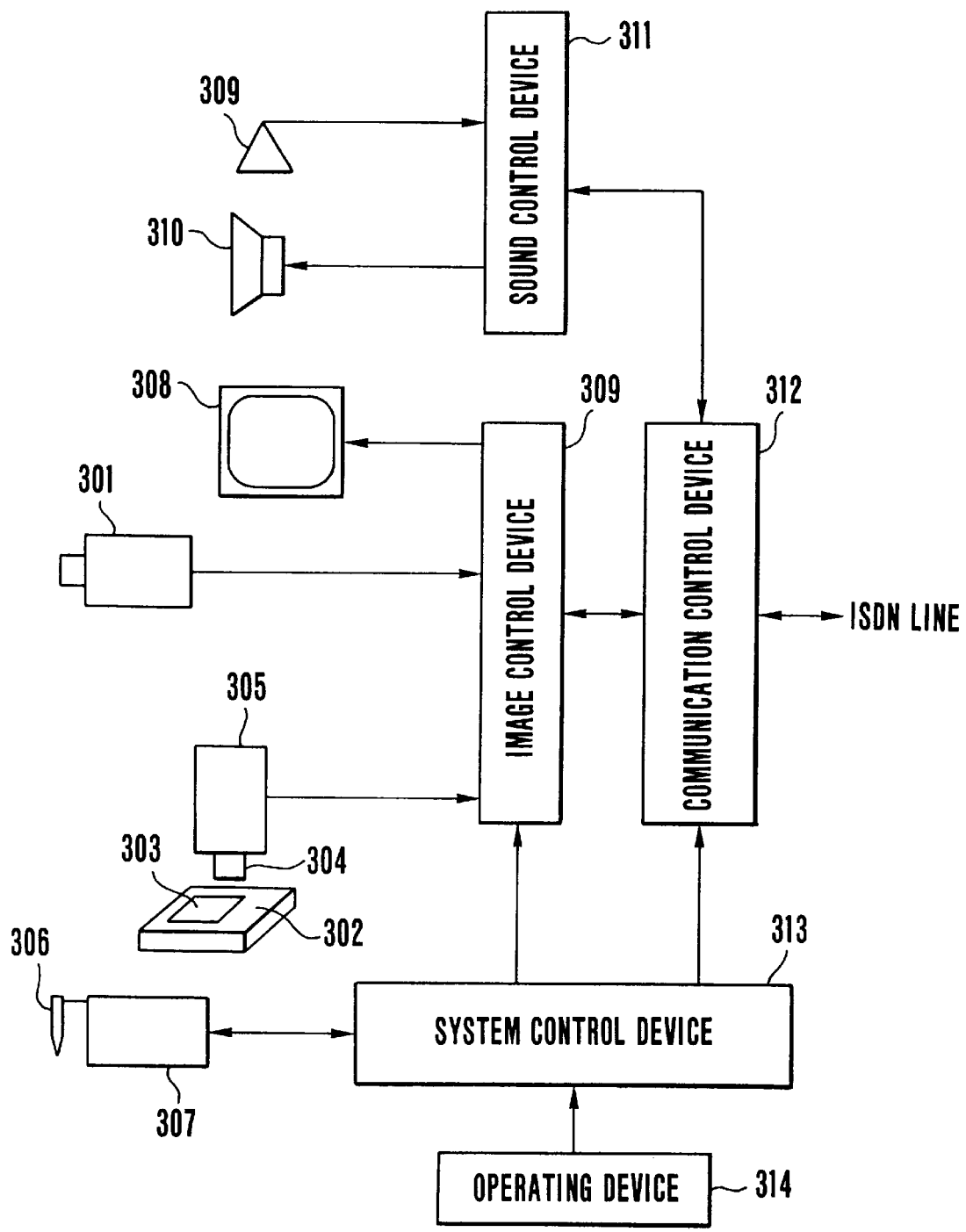
FIG. 2 is a schematic block diagram showing the arrangement of a conventional video conference system.
Figure 3:
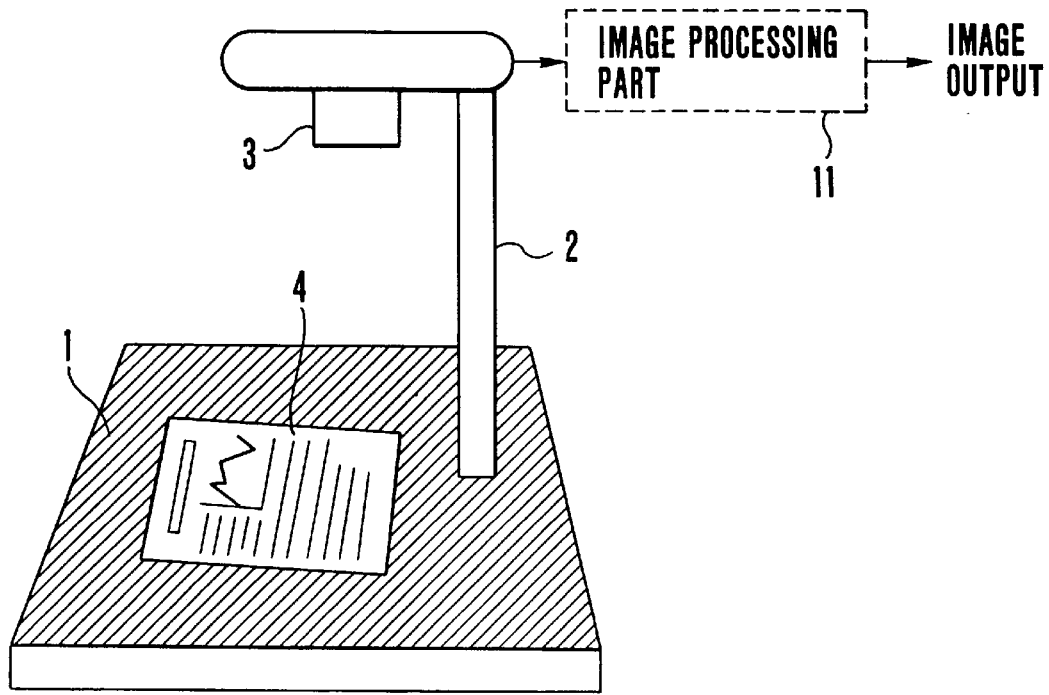
FIG. 3 is a schematic view showing the arrangement of an image input device according to a first embodiment of the present invention.

FIG. 3 is a schematic view showing the arrangement of an image input device according to a first embodiment of the present invention. In FIG. 3, the same reference numerals are used to denote elements substantially identical to those shown in FIG. 1. As is shown in FIG. 3, the image input device includes a base 1 on which to place an original 4, a post 2 disposed on the base 1, and a video camera 3 provided at an extending end of the post 2 for picking up an image of the original 4. An image signal obtained by picking up the image by means of the video camera 3 is outputted via an image processing part 11 in the form of an image signal indicative of an image of the original 4 the inclination of which is corrected.

Figure 4:
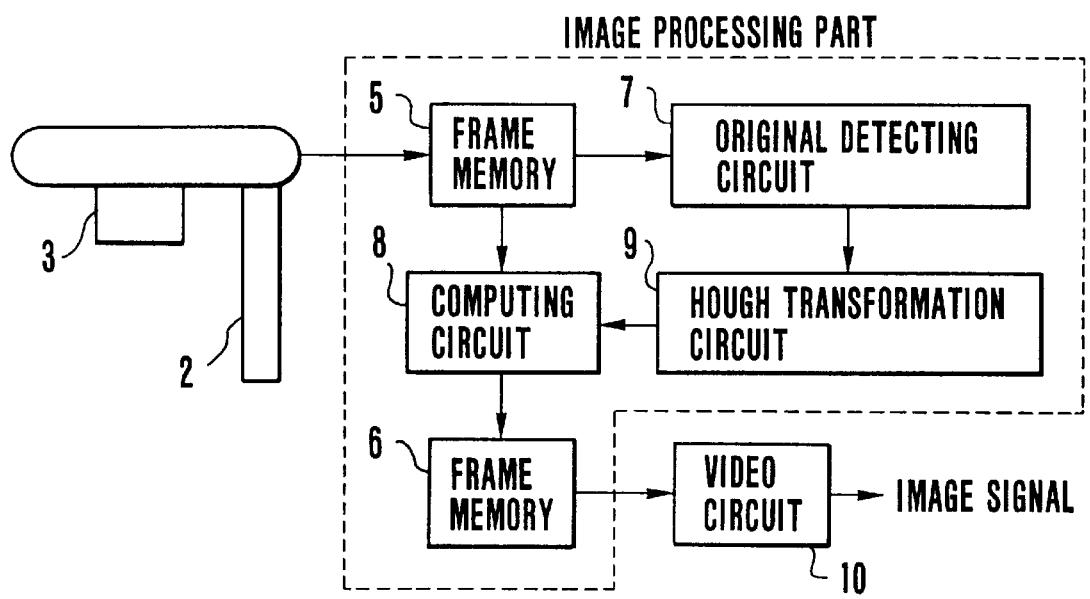
FIG. 4 is a detailed block diagram of the image processing part shown in FIG. 3.

FIG. 4 shows in more detail the arrangement of the image processing part 11. The image signal obtained by picking up the image of the original 4 by means of the video camera 3 is first memorized in a first frame memory 5. The image signal memorized in the first frame memory 5 is supplied to an original detecting circuit 7, in which the external border of the original 4 is detected. The detection output from the original detecting circuit 7 is supplied to a Hough transformation circuit 9, in which a rotational angle is obtained. A computing circuit 8 applies a rotating computation processing to the image information memorized in the first frame memory 5 on the basis of the rotational angle obtained by the Hough transformation circuit 9, whereby the inclination of the original 4 is corrected. The image of the original 4 the inclination of which has thus been corrected is memorized in a second frame memory 6. In the above-described manner, the image signal outputted from the second frame memory 6 via a video circuit 10 is provided as an optimum image such as that shown in FIG. 6.

Figure 5:
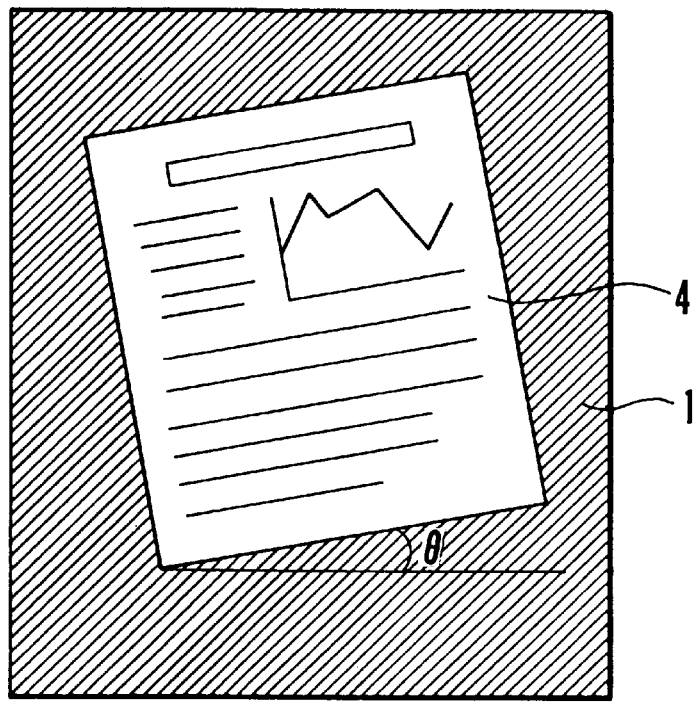
FIG. 5 is a view showing the state in which an original is obliquely placed.
Figure 7:
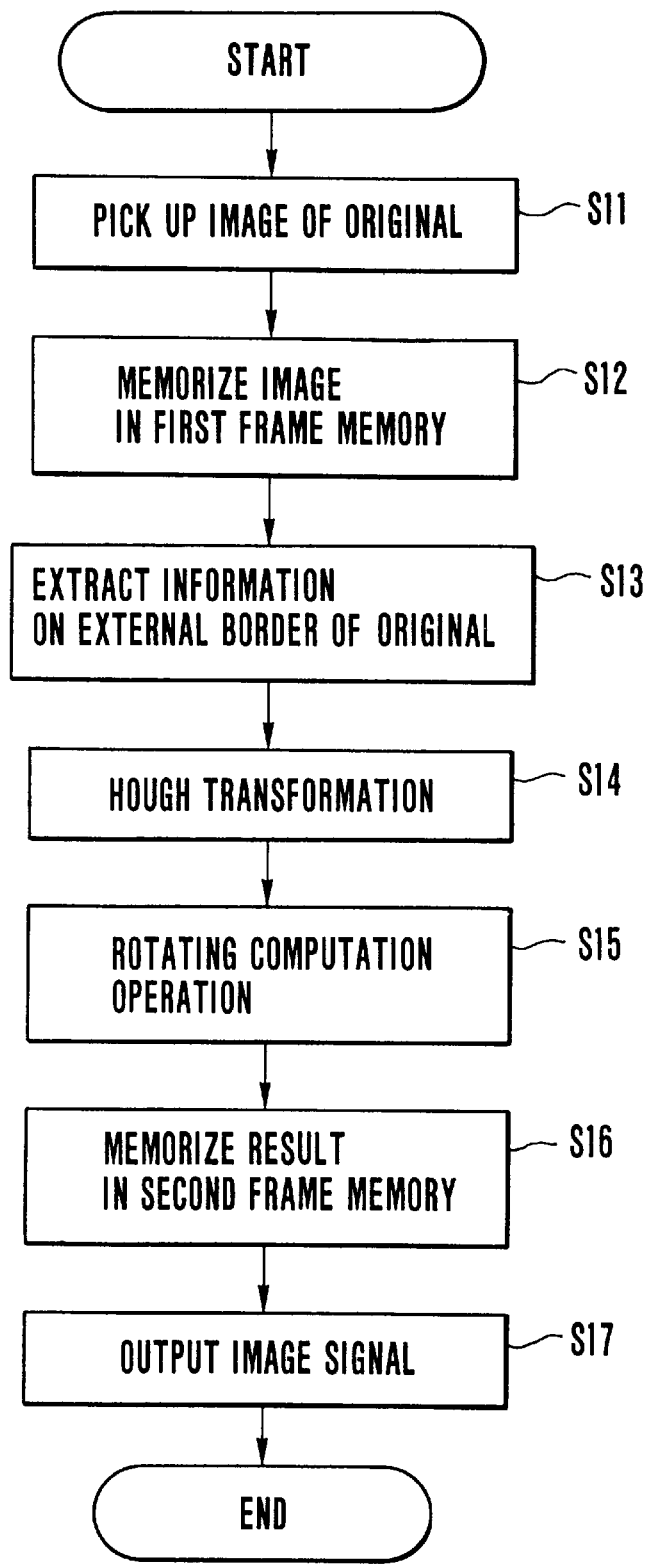
FIG. 7 is a flowchart which serves to explain the operation of the first embodiment of the present invention.
Figure 8:
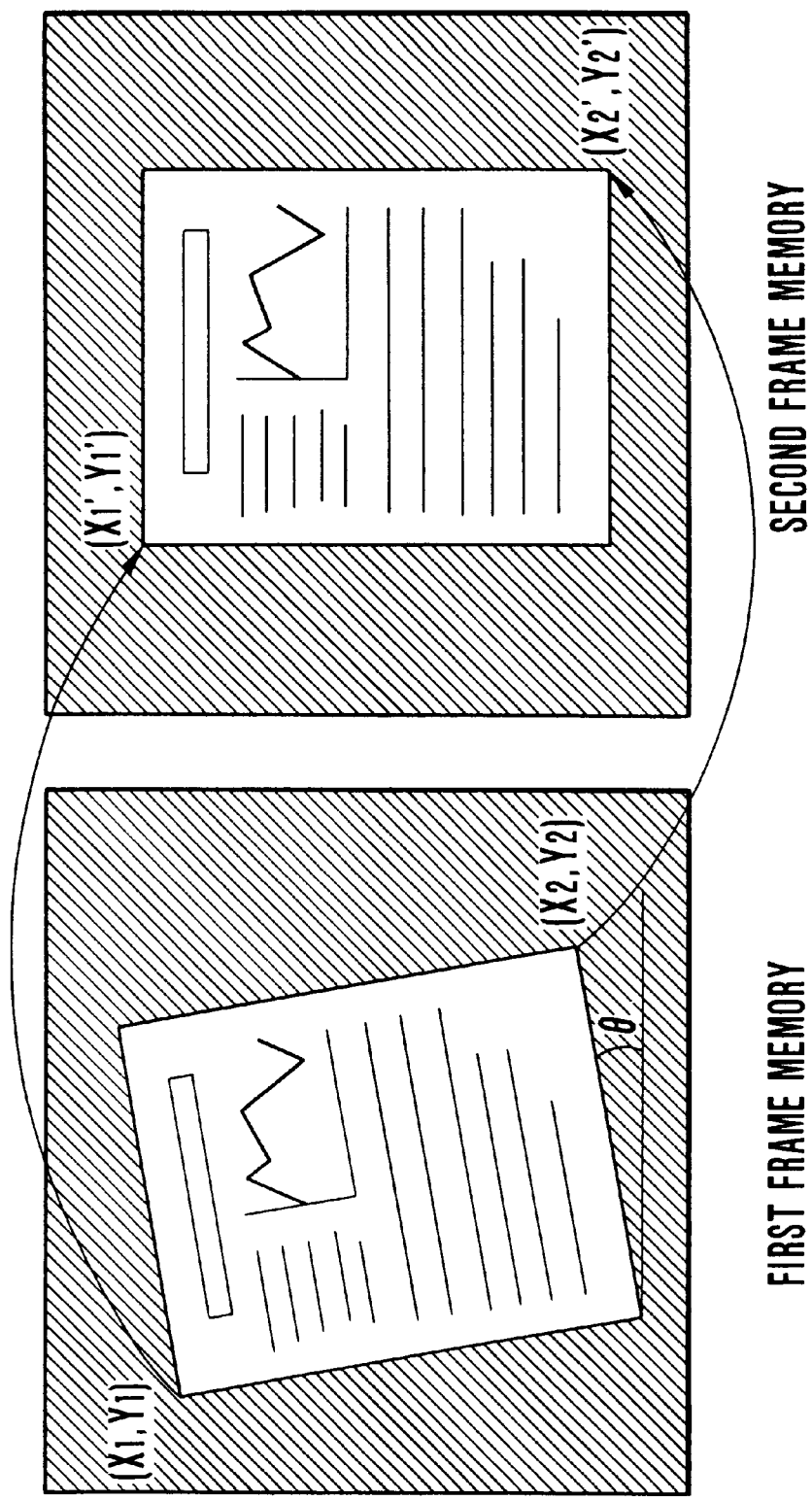
FIG. 8 is a view which serves to explain the manner in which the inclination of the original is corrected.

The operation of the first embodiment having the above-described arrangement will be described below with reference to FIG. 7. When the original 4 is placed on the base 1, an image of the original 4 is picked up by the video camera 3 (S11), and the obtained image information is memorized in the first frame memory 5 (S12). If it is assumed that the original 4 is obliquely placed as shown in FIG. 5, the original detecting circuit 7 applies a differential computation processing to the image information memorized in the first frame memory 5, thereby extracting information on the external border of the original 4 (S13). The extracted information on the external border is subjected to a Hough transformation by the Hough transformation circuit 9 (S14), whereby an inclination angle θ of the original 4 is calculated. As shown in FIG. 8, on the basis of the calculated inclination angle θ, the computing circuit 8 performs the following rotating computation operation on pixel data memorized at an address coordinate $(X_n, Y_n)$ within the image information memorized in the first frame memory 5 (S15):

$$\begin{pmatrix} X_n' \\ Y_n' \end{pmatrix} = \begin{pmatrix} \cos\theta & \sin\theta \\ -\sin\theta & \cos\theta \end{pmatrix} \begin{pmatrix} X_n \\ Y_n \end{pmatrix}$$

Figure 6:
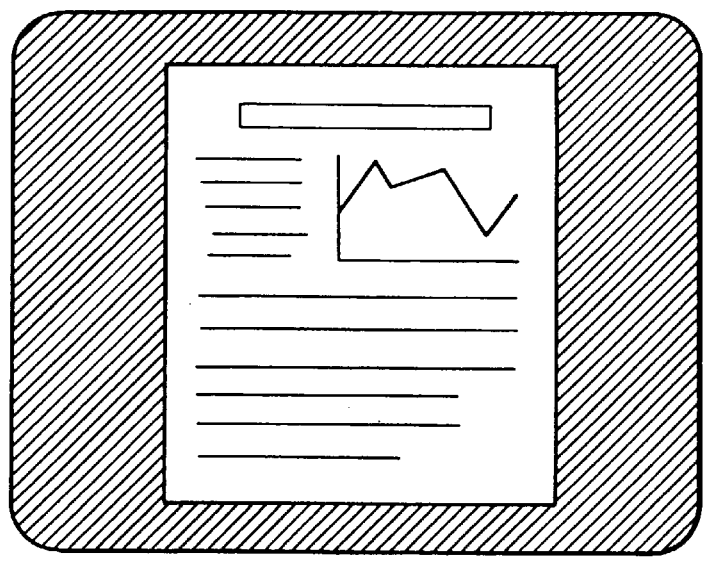
FIG. 6 is a view showing an image of the original the inclination of which is corrected.

Thus, a converted address coordinate $(X_n', Y_n')$ is obtained. The pixel data memorized at the address coordinate $(X_n, Y_n)$ of the first frame memory 5 is transferred to the address coordinate $(X_n', Y_n')$ of the second frame memory 6, thus completing a rotating computation process relative to one pixel data. The example shown in FIG. 8 illustrates the rotation of X1, Y1 to X1', Y1' and of X2, Y2 to X2', Y2'. Such a rotating computation process is performed on all pixel data, and the results are memorized in the second frame memory 6 (S16). Consequently, an image of the original 4 the inclination of which is properly corrected as shown in FIG. 6 is memorized in the second frame memory 6, and the image is outputted to an external apparatus via the video circuit 10 as an image signal (S17).

Figure 9:
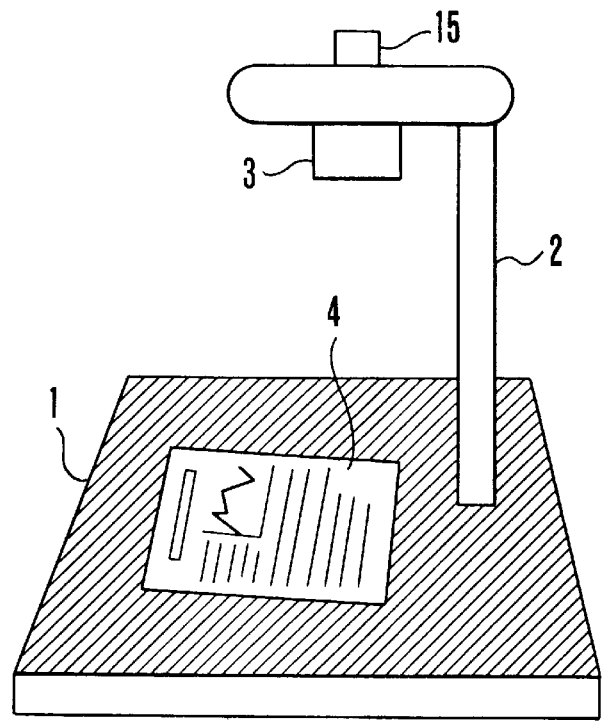
FIG. 9 is a schematic view showing the arrangement of an image input device according to a second embodiment of the present invention.
Figure 10:
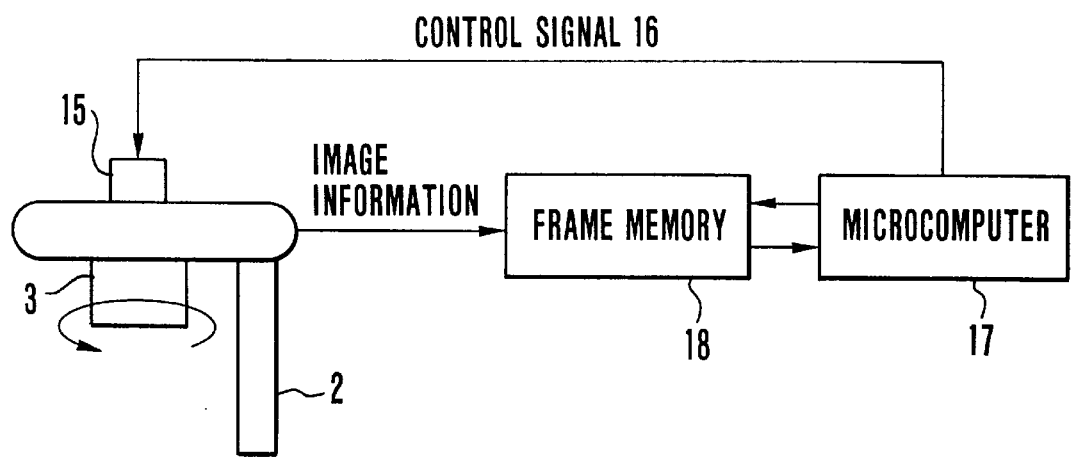
FIG. 10 is a detailed block diagram which serves to explain the operation of the second embodiment of FIG. 9.
Figure 11:
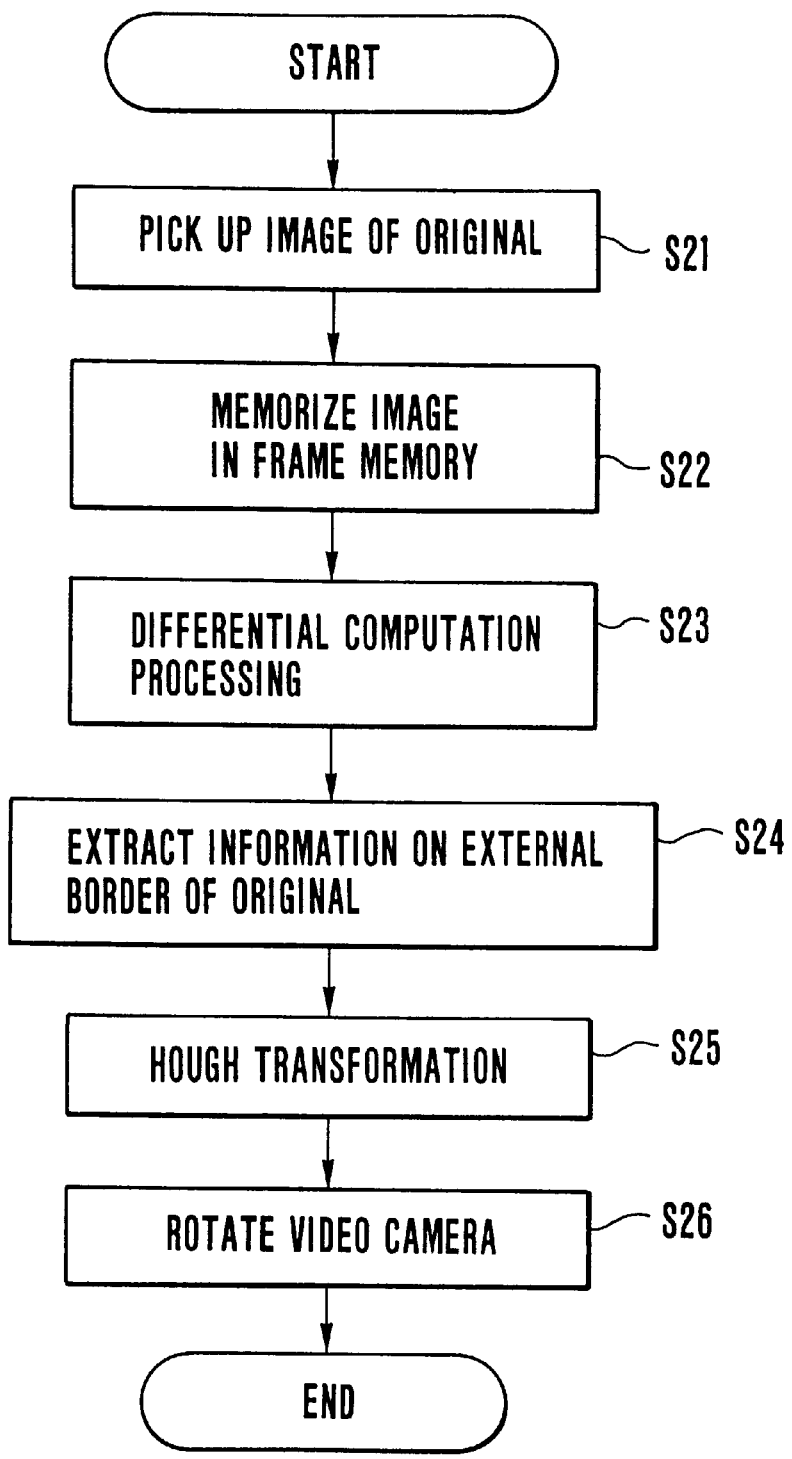
FIG. 11 is a flowchart which serves to explain an inclination-angle detection operation according to the embodiment shown in FIGS. 9 and 10.

FIGS. 9 through 11 show an image input device according to a second embodiment of the present invention. The second embodiment of the present invention will be described below with reference to FIGS. 9 through 11. In FIG. 9, the same reference numerals are used to denote elements substantially identical to those shown in FIG. 1.

FIG. 9 is a schematic view showing the arrangement of the image input device according to the second embodiment of the present invention. As shown in FIG. 9, the image input device includes the base 1 on which to place the original 4, the post 2 disposed on the base 1, the video camera 3 provided at an extending end of the post 2 for picking up an image of the original 4, and a servo motor 15 for rotating the video camera 3. As shown in FIG. 10, the video camera 3 is arranged to rotate about an optical axis which extends between the original 4 and the video camera 3 by means of the servo motor 15, and the operation of the servo motor 15, such as the start, running or stop thereof, is controlled by an instruction indicated by a control signal 16 outputted from a microcomputer 17.

The operation of the second embodiment having the above-described arrangement will be described below with reference to FIG. 11. When the original 4 is placed on the base 1, an image of the original 4 is picked up by the video camera 3 (S21), and the obtained image information is memorized in the frame memory 18 (S22). If it is assumed that the original 4 is obliquely placed as shown in FIG. 5, the microcomputer 17 applies a differential computation processing to the image information memorized in the frame memory 18 (S23), thereby extracting information on the external border of the original 4 (S24). Then, the microcomputer 17 applies a Hough transformation to the extracted information on the external border (S25), thereby calculating the inclination angle of the original 4. Furthermore, the microcomputer 17 outputs the control signal 16 for correcting the inclination of the original 4, to activate the servo motor 15, thereby rotating the video camera 3 so that the inclination of the original 4 is corrected. Thus, the inclination of the original 4 is corrected (S26), whereby an optimum image of the original 4, such as that shown in FIG. 6, is obtained.

As described above, in either of the above-described embodiments, an image memory and an angle-of-original-inclination detecting circuit are provided in association with an image input device, so that it is possible to achieve the advantage of obtaining an optimum image of an original by performing a rotating computation on image information relative to the original.

Furthermore, in the second embodiment, there is provided a rotating motor for rotating a video camera for picking up an image of an original, so that it is possible to achieve the advantage of obtaining an optimum image of the original by rotating the video camera by means of the rotating motor and correcting the inclination of the original.

Figure 12:
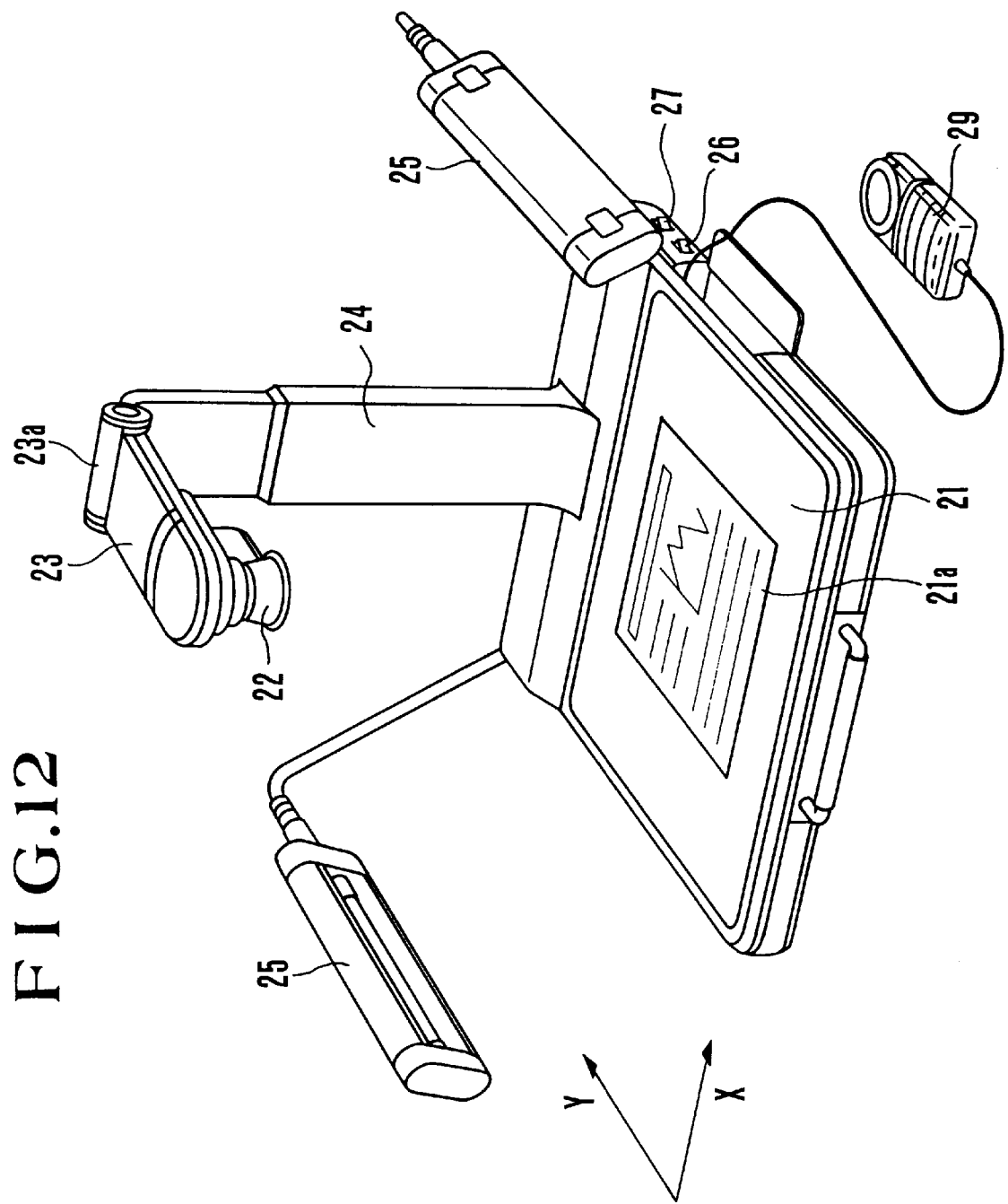
FIG. 12 is a diagrammatic, perspective view of an image input device according to a third embodiment of the present invention.
Figure 13:
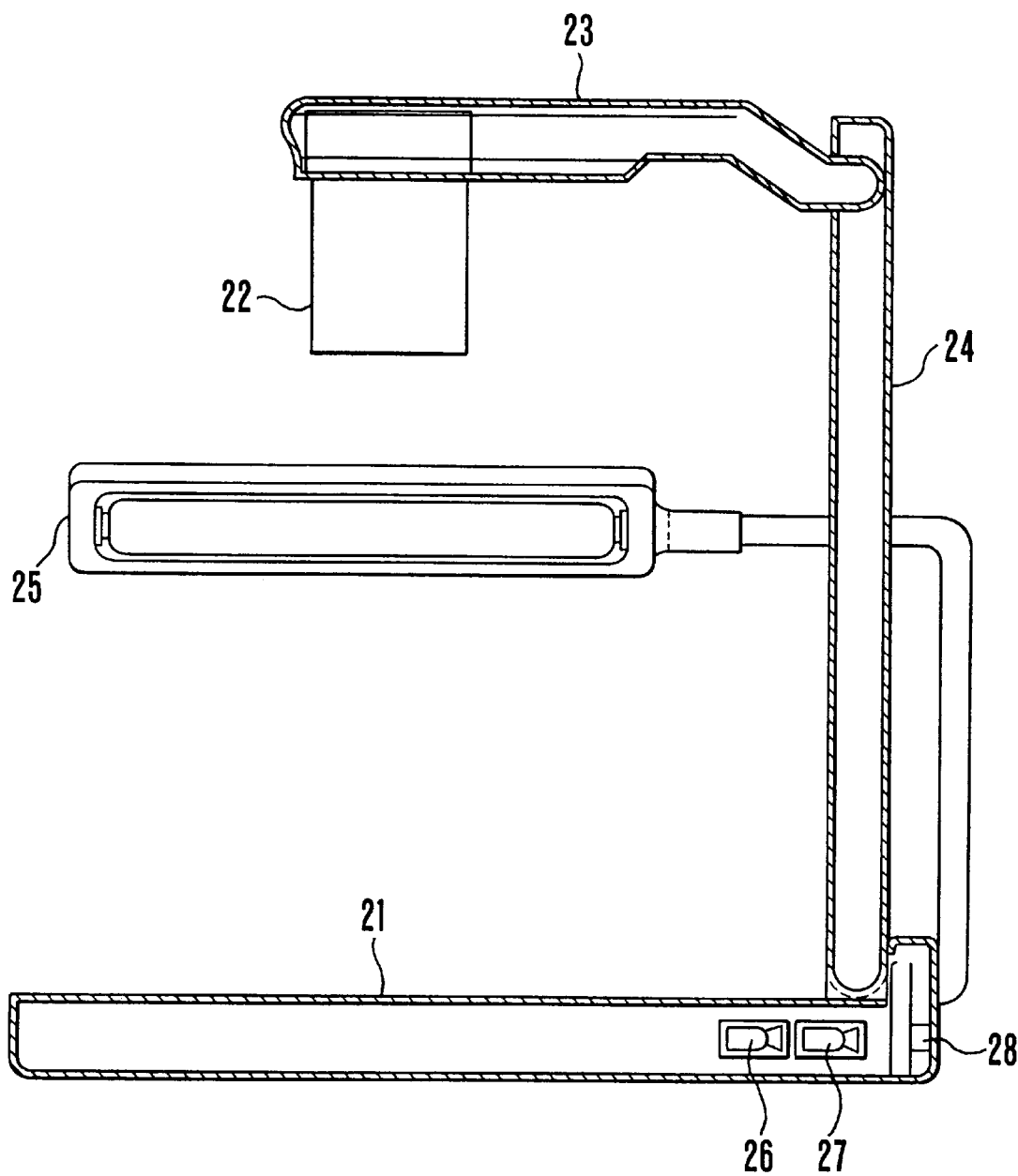
FIG. 13 is a diagrammatic, cross-sectional view of the essential portions of the third embodiment shown in FIG. 12.

FIG. 12 is a diagrammatic, perspective view of the external appearance of an image input device according to a third embodiment of the present invention, and FIG. 13 is a cross-sectional view taken in the X and Y directions of FIG. 12.

In the arrangement shown in FIGS. 12 and 13, an element 21 is a base on which to place an object (such as an original) 21a in order to pick up an image thereof, and the base 21 is made from a diffuse reflecting plate for the purpose of preventing incidence of light diffusely reflected from the base 21 upon a video camera 22. Also, the color of the diffuse reflecting plate is selected to be a relatively dark color so that the size of the object 21a can be detected. A method for detecting the size of the object 21a will be described later.

The video camera 22 is fixed to and supported by a horizontal support part 23, and a vertical support part 24 having a vertically variable length is fixed to the base 21. The horizontal support part 23 is connected to the base 21 via the vertical support part 24 and is turnable about a connecting part 23a for providing connection with the vertical support part 24.

Illumination parts 25 are disposed above the opposite sides of the base 21, respectively. The illumination parts 25 are used when it is dark on the base 21, and are turned on/off by a switch 26.

An element 27 is a power switch of the present device, an element 28 (refer to FIG. 13) is an external output terminal for outputting an image signal outputted from the video camera 22 to an external apparatus (such as a television monitor), and an element 29 is a remote operating device for electrically specifying an operation for each operated part and causing the operated part to execute the specified operation. Although FIG. 12 shows that the remote operating part 29 is connected to the body of the present device, a cordless operating part may also be adopted.

Figure 14:
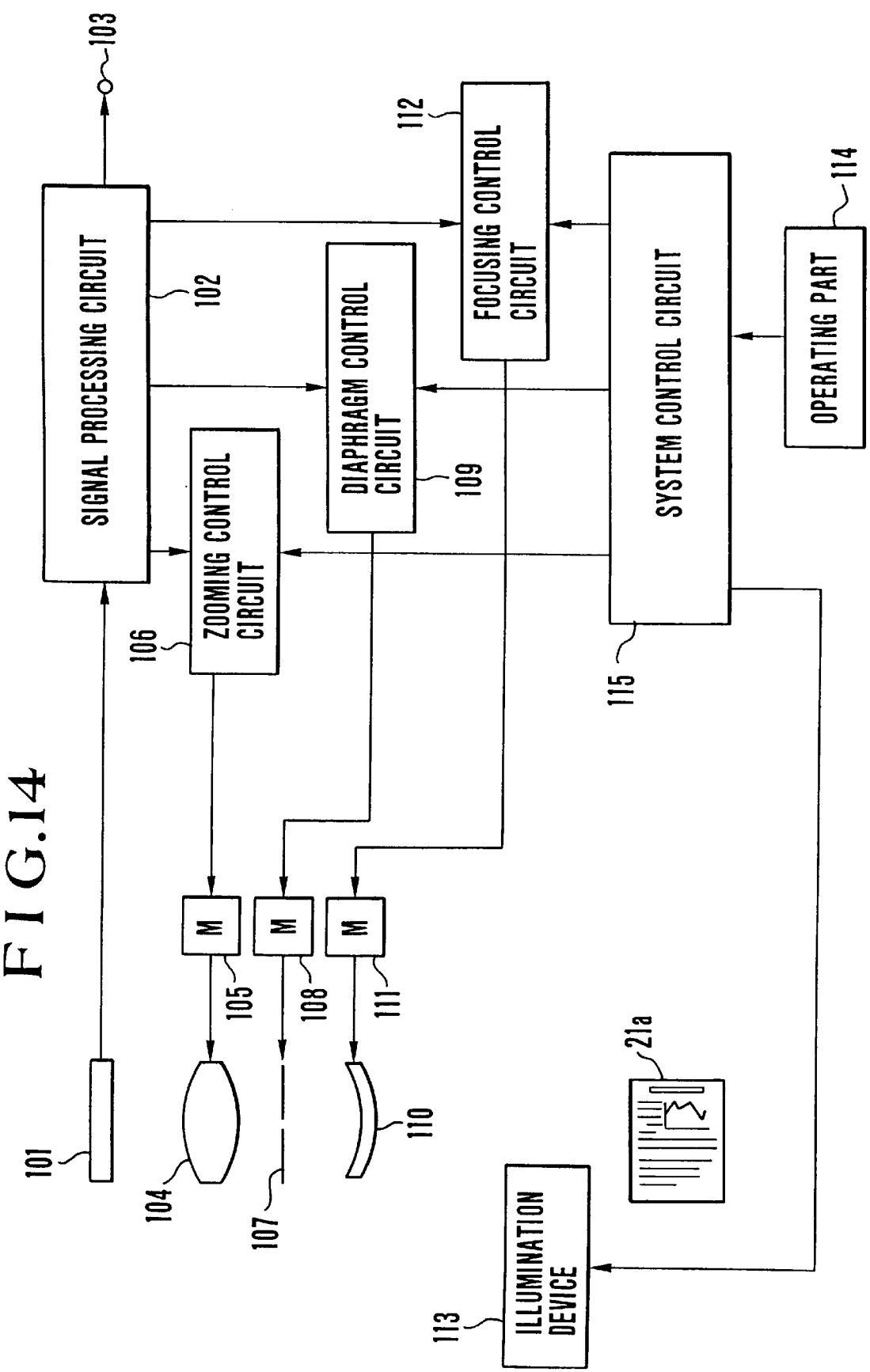
FIG. 14 is a block diagram showing the arrangement of the third embodiment shown in FIG. 12.

FIG. 14 is a block diagram of the image input device of FIG. 12.

The arrangement shown in FIG. 14 includes an image pickup device 101, such as a CCD for picking up an image of an object 21a, a signal processing circuit 102 for converting an image signal outputted from the image pickup device 101 into a television signal such as an NTSC signal, and an external output terminal 103 through which the television signal outputted from the signal processing circuit 102 is outputted to an external apparatus.

The arrangement also includes a zooming lens 104 for varying the magnification at which an image is picked up, a zooming-lens motor 105 for moving the zooming lens 104, and a zooming control circuit 106 for controlling the zooming-lens motor 105 by using a signal outputted from the signal processing circuit 102.

The arrangement also includes a diaphragm mechanism 107, a diaphragm motor 108 for varying the diaphragm mechanism 107, and a diaphragm control circuit 109 for controlling the diaphragm motor 108 by using a signal outputted from the signal processing circuit 102.

The arrangement also includes a focusing lens 110, a focusing-lens motor 111 for moving the focusing lens 110, and a focusing control circuit 112 for controlling the focusing-lens motor 111 by using a signal outputted from the signal processing circuit 102.

The arrangement also includes an illumination device 113, an operating part 114 for giving an instruction to select a desired operation such as automatic/manual focus adjustment, automatic/manual zooming adjustment, automatic/manual diaphragm-mechanism adjustment or the on/off state of a power source or other parts, and a system control circuit 115 for controlling each circuit in accordance with an instruction given by the operating part 114.

A zooming control operation according to the third embodiment will be described below.

Figure 15:
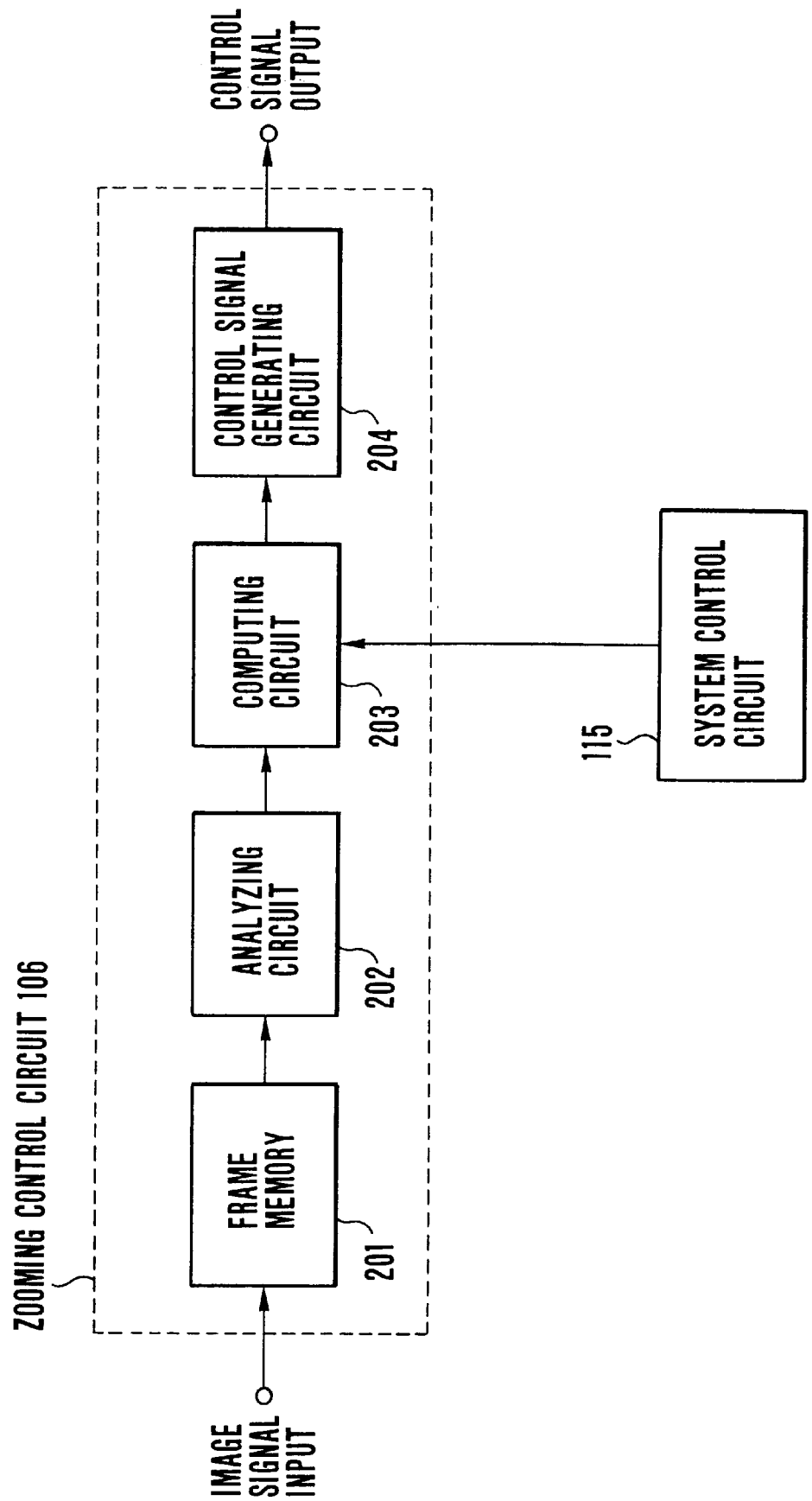
FIG. 15 is a block diagram showing in detail the zooming control circuit 106 shown in FIG. 14.

FIG. 15 is a detailed block diagram showing the arrangement of the zooming control circuit 106. In FIG. 15, the same reference numerals are used to denote elements substantially identical to those shown in FIG. 14, and description thereof is omitted hereinbelow.

The zooming control circuit 106 shown in FIG. 15 includes a frame memory 201 for memorizing an image signal outputted from the signal processing circuit 102, an analyzing circuit 202 for analyzing the frequency components of the image signal memorized in the frame memory 210, a computing circuit 203 for computing an enlargement ratio, and a control signal generating circuit 204 for generating a control signal for controlling the zooming-lens motor 105, on the basis of an output signal from the computing circuit 203. The computing circuit 203 is controlled by the system control circuit 115.

Figure 16:
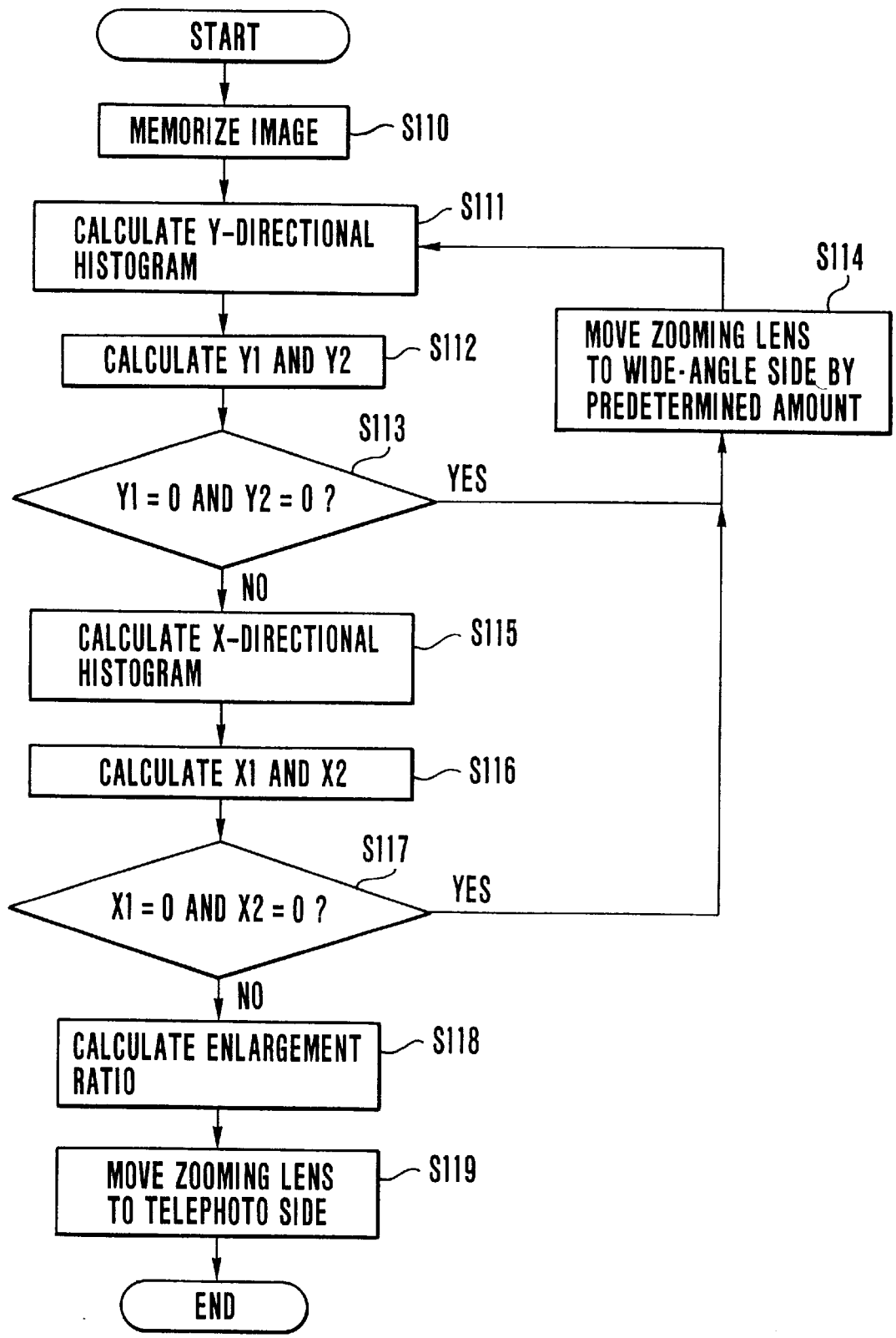
FIG. 16 is a flowchart showing a zooming-lens control operation according to the third embodiment of the present invention.

A control operation for the zooming lens 104 according to the third embodiment will be described with reference to the flowchart shown in FIG. 16.

Figure 17:
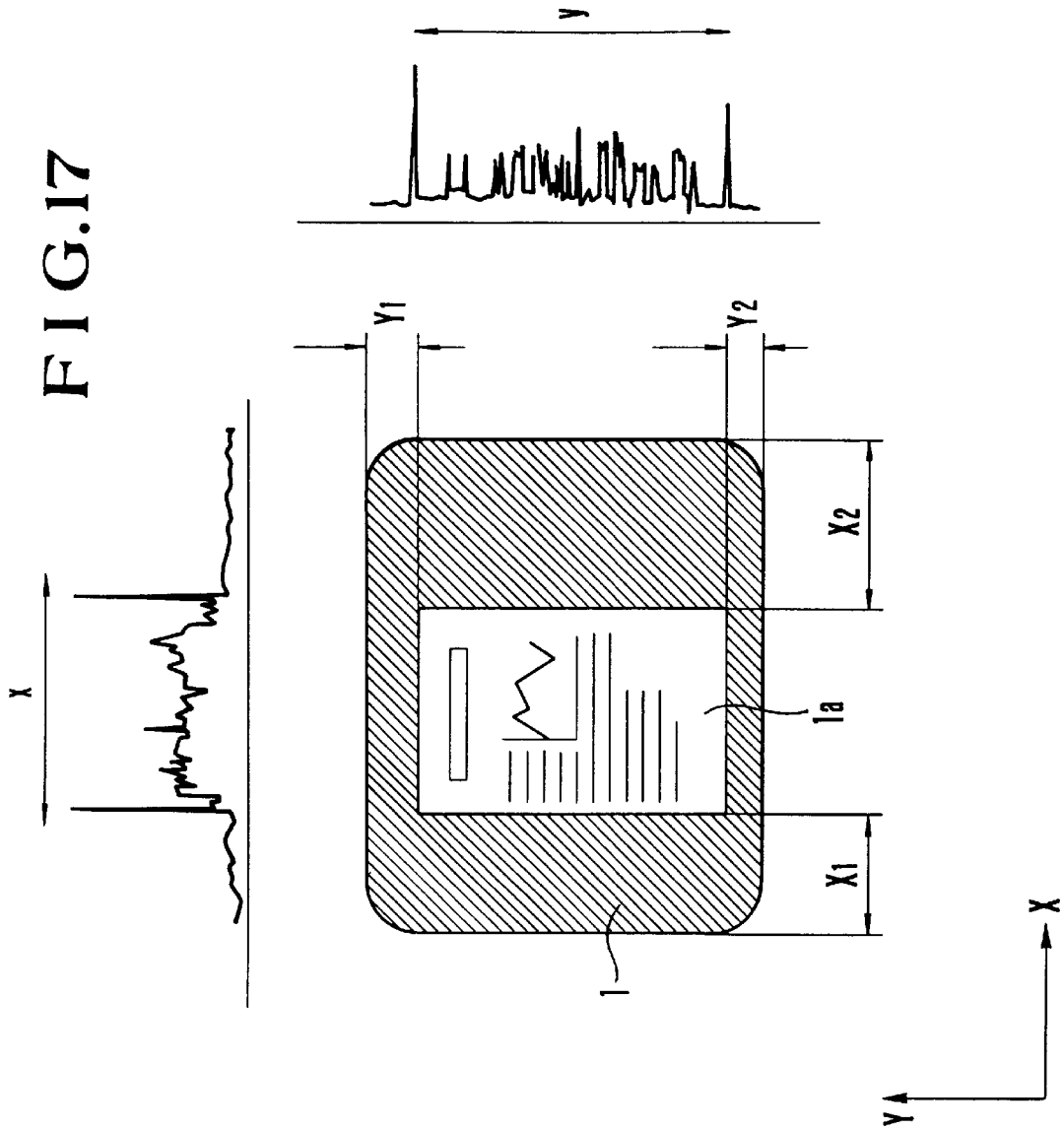
FIG. 17 is a view showing one example of a frequency histogram of an image, taken in the Y and X directions thereof.

First, an image signal outputted from the video camera 22 is memorized in the frame memory 201 (S110), and the analyzing circuit 202 reads out the image signal memorized in the frame memory 201 and calculates a histogram of the Y-directional (refer to FIG. 12) frequency components of an object (for example, an original) placed on the base 21 (S111). The calculated histogram is, for example, as shown in FIG. 17. The vertical axis of the Y-directional histogram shown in FIG. 17 corresponds to the frequency components.

Since the color of the base 21 is selected to be a relatively dark color (for example, gray), the frequency component of the base 21 is of a small value. However, as long as the color of the object 21a placed on the base 21 is not the same as that of the base 21, the object 21a has lower or higher frequency components than the base 21. The analyzing circuit 202 can detect the edge portion of a picked-up image of the object 21a by utilizing this premise.

The computing circuit 203 calculates the values of the portions $Y_1$ and $Y_2$ shown in FIG. 17 by using the analysis result provided by the analyzing circuit 202 (S112).

Then, if at least either one of the values of the portions $Y_1$ and $Y_2$ is "0" (S113), the zooming lens 104 is moved toward a wide-angle side by a predetermined amount (S114). Subsequently, the above-described operation is repeated until both values of the portions $Y_1$ and $Y_2$ exceed "0".

If both portions $Y_1$ and $Y_2$ exhibit values which exceed "0" (S113), a histogram of the X-directional (refer to FIG. 12) frequency components is calculated (S115).

The computing circuit 203 calculates the values of the portions $X_1$ and $X_2$ shown in FIG. 17 by using the calculated histogram of the X-directional frequency components (S116).

Then, if at least either one of the values of the portions $X_1$ and $X_2$ is "0" (S117), the zooming lens 104 is moved toward the wide-angle side by a predetermined amount (S114). Subsequently, the above-described operation is repeated until both values of the portions $X_1$ and $X_2$ exceed "0".

If both portions $X_1$ and $X_2$ exhibit values which exceed "0" (S117), an optimum enlargement ratio of the picked-up image of the object 21a is calculated from the values of the portions $X_1$, $X_2$, $Y_1$ and $Y_2$ (S118). Incidentally, the optimum enlargement ratio is calculated as a maximum value so far as the size of the picked-up image of the object 21a does not exceed the image pickup area of the video camera 22.

Then, the zooming lens 104 is moved toward a telephoto side on the basis of the calculated enlargement ratio (S119).

Figure 18:
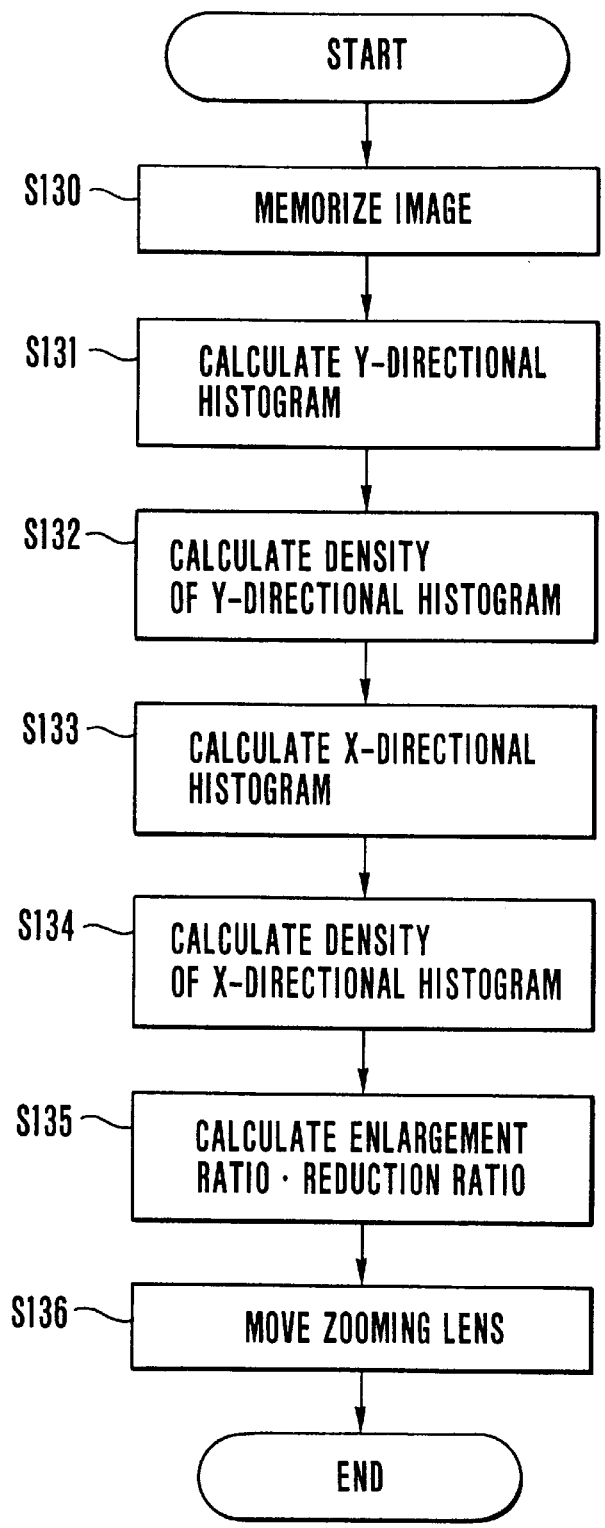
FIG. 18 is a flowchart showing a zooming-lens control operation according to a fourth embodiment of the present invention.

Another control operation of the zooming lens 104 according to a fourth embodiment of the present invention will be described below with reference to the flowchart shown in FIG. 18.

If the object 21a whose image is to be picked up by the video camera 22 is an original on which characters are drawn, it is necessary to change the display size of the characters to a size which can be visually identified on a television monitor. To meet this demand, according to the fourth embodiment, there is provided an arrangement capable of adjusting the zooming lens 104 to change the display size of the characters drawn on the original to a size which can be visually identified on the television monitor. According to the fourth embodiment, a method for determining the actual size of the characters drawn on the original is arranged to determine the actual size of the characters of the original on the basis of the density of the histogram of the frequency components of an image signal obtained by picking up an image of the original, by making use of the characteristic that the density of the histogram of the frequency components of the image signal corresponds to the density of the characters formed on the original.

In operation, an image signal outputted from the video camera 22 is first memorized in the frame memory 210 (S130). The analyzing circuit 202 reads out the image signal memorized in the frame memory 201 and calculates a histogram of the Y-directional frequency components of an original placed on the base 21 (S131).

Then, the computing circuit 203 calculates a value relative to the density of the histogram of the frequency components of the portion y shown in FIG. 17 by using the analysis result provided by the analyzing circuit 202 (S132).

Then, a histogram of the X-directional frequency components of the original placed on the base 21 is calculated (S133).

Then, the computing circuit 203 calculates a value relative to the density of the histogram of the frequency components of the portion x shown in FIG. 17 by using the analysis result provided by the analyzing circuit 202 (S134).

Then, an enlargement or reduction ratio which is suitable for use in changing the display size of the characters of the original to a predetermined size which can be visually identified on a television monitor or the like is calculated on the basis of the calculated values relative to the densities of the histograms of the frequency components of the respective portions x and y (S135).

Then, the zooming lens 104 is moved on the basis of the enlargement or reduction ratio calculated in Step S135 (S136).

It is to be noted that even if any of the image input devices according to the present embodiments is applied to an image input part of a system (such as a video conference system) which is made up of a plurality of devices or to an independent, image input device, it is possible to achieve advantages similar to the above-described ones.

In any of the image input devices according to the present embodiments, the analyzing circuit and the computing circuit may be realized by a microcomputer which is arranged to operate according to a program.

As is apparent from the foregoing description, since the image input device according to the present embodiments is arranged to determine the size of an object whose image is to be picked up and control the photographic magnification of a video camera which is used for picking up the image, not only is it possible to obtain an optimum image, but also operability can be further improved.

What is claimed is:

1. An image input device for inputting an image of an original and generating an image signs for use in another device, comprising:

(A) an original placing base having an original placing face of a color having a low frequency component;

(B) image pickup means for picking up the image of the original and outputting the image signal corresponding to the original;

(C) detection means for detecting a state of distribution of frequency components in the image signal outputted from said image pickup means;

(D) judging means for judging an edge of the original on the basis of the detection result of the detection means, said judging means controlling variation of magnification of the image input device so as to assure the edge of the original is positioned near a limit of a maximum image pickup area of the image pickup means; and (E) a support member provided erectly on the original placing base to support the image pickup means at a free tip portion thereof.

2. An image input device according to claim 1, wherein said detection means is arranged to calculate a size of the original image relative to the image plane of said image pickup means, in accordance with the state of distribution of the frequency components detected by said detection means, and said judging means controls a size of the original image indicated in the image signal outputted from said image pickup means.

3. An image input device according to claim 2, wherein said image pickup means includes:

(a) an optical lens for picking up the original image, said optical lens having a magnification-varying optical system; and (b) an image pickup device for converting the original image picked up by said optical lens into the image signal and outputting the image signal.

4. An image input device according to claim 3, wherein said judging means is arranged to control a photographic magnification provided by the magnification-varying optical system of said optical lens in accordance with the size of the original image relative to the image plane of said image pickup means.

5. An image input device for inputting an image of an original and generating an image signal for use in another device, comprising:

(A) image pickup means for picking up the image of the original and outputting the image signal corresponding to the original;

(B) detection means for detecting a state of distribution of frequency components in the image signal outputted from said image pickup means;

(C) calculating means for calculating a size of a figure or a character on the original image relative to the image plane of said image pickup means, in accordance with the state of distribution of the frequency components detected by said detection means;

(D) control means for magnification-varying the figure or the character in accordance with the size of the figure or the character on the original image calculated by said calculating means so that the figure or the character can be recognized on a monitor; and (E) a support member provided erectly on said image input device to support the image pickup means at a free tip portion thereof.

6. An image input device according to claim 5, wherein said image pickup means includes:

(a) an optical lens for picking up the original image, said optical lens having a magnification-varying optical system; and (b) an image pickup device for converting the original image picked up by said optical lens into the image signal and outputting the image signal.

7. An image input device according to claim 6, wherein said control means is arranged to control a photographic magnification provided by the magnification-varying optical system of said optical lens, in accordance with the size of the figure or the character on the original image relative to the image plane of said image pickup means.

* * * * *

UNITED STATES PATENT AND TRADEMARK OFFICE
CERTIFICATE OF CORRECTION

PATENT NO. : 5,940,128
DATED : August 17, 1999
INVENTOR(S) : Kazuhiko Morimura

It is certified that error appears in the above-identified patent and that said Letters Patent are hereby corrected as shown below:

Col. 8, line 45, delete "image signs" and insert -- image signal --.

Signed and Sealed this

Third Day of April, 2001

Attest:

NICHOLAS P. GODICI

*Attesting Officer*  Acting Director of the United States Patent and Trademark Office